US008438236B2

(12) United States Patent
Van Gassel et al.

(10) Patent No.: US 8,438,236 B2
(45) Date of Patent: May 7, 2013

(54) DEVICE AND A METHOD FOR TRANSMITTING NOTIFICATION MESSAGES AND A CORRESPONDING DEVICE AND METHOD FOR RECEIVING NOTIFICATION MESSAGES

(75) Inventors: Jozef Pieter Van Gassel, Tampere (FI); Gilein De Nijs, Eindhoven (NL); Vojkan Mihajlovic, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 56 days.

(21) Appl. No.: 12/529,934

(22) PCT Filed: Feb. 28, 2008

(86) PCT No.: PCT/IB2008/050720
§ 371 (c)(1),
(2), (4) Date: Sep. 4, 2009

(87) PCT Pub. No.: WO2008/107824
PCT Pub. Date: Sep. 12, 2008

(65) Prior Publication Data
US 2010/0106796 A1 Apr. 29, 2010

(30) Foreign Application Priority Data

Mar. 8, 2007 (EP) .................................... 07103786

(51) Int. Cl.
*G06F 15/16* (2006.01)
(52) U.S. Cl.
USPC ............................ 709/207; 709/206; 709/224
(58) Field of Classification Search .................. 709/224, 709/214, 206, 207
See application file for complete search history.

(56) References Cited

U.S. PATENT DOCUMENTS

| 5,566,357 | A | 10/1996 | Holcman |
| 6,108,542 | A | 8/2000 | Swanchara et al. |
| 7,073,129 | B1 | 7/2006 | Robarts et al. |
| 2005/0101306 | A1 | 5/2005 | Zabawskyj et al. |
| 2009/0094333 | A1* | 4/2009 | Kyprianou .................... 709/206 |

FOREIGN PATENT DOCUMENTS

| WO | 0059167 A1 | 10/2000 |
| WO | 2004095273 A2 | 11/2004 |

OTHER PUBLICATIONS

Luby et al: "Layered Coding Transport (LCT) Building Block"; RFC 3451, Dec. 2002, 28 Page Document.
Luby et al: "Asynchronous Layered Coding (ALC) Protocol Instantiation"; RFC 3450, Dec. 2002, 32 Page Document.

(Continued)

*Primary Examiner* — Adnan Mirza
(74) *Attorney, Agent, or Firm* — Shimokaji & Assoc., PC

(57) ABSTRACT

A device and a method for transmitting notification messages (165) and a corresponding device and method for receiving notification messages. A transmitting device (100) receives a filter definition (135) defining a filter type for use in filtering of the notification messages. The filter definition is transmitted to a terminal (160) via a broadcast installation (150). The terminal configures a filter based upon the filter definition. When a 5 notification is to be sent notification input data (145) is received and filter elements (175) are determined. The filter elements correspond to parameters derived from the filter definition. The value of the parameters correspond to the notification input data. The notification messages comprising the filter elements are generated and sent to the terminal. The terminal filters the notification messages using the filter, where the filtering is based upon the filter 10 elements.

17 Claims, 12 Drawing Sheets

OTHER PUBLICATIONS

ETSI Standard EN 302 304: Digital Video Broadcasting (DVB):; Transmission System for Handheld Terminals (DVB-H), (Nov. 2004), 14 Page Document.

ETSI Standard TS 102 471: Digital Video Broadcasting (DVB); IP Datacast Over DVB-H: Electronic Service Guide (ESG), (Apr. 2009), 133 Page Document.

* cited by examiner

```xml
<NotificationsFilterTable>
<NotificationsFilter filterID="2">  ~600
    <FilterValue length="8" type="enum">  ~610
        <FilterEnum enumID="cbms://philips.com/notifications/soccerTeams">
            <FilterEnumItem itemID="1">Germany</FilterEnumItem>
            <FilterEnumItem itemID="2">France</FilterEnumItem>
            <FilterEnumItem itemID="3">The Netherlands</FilterEnumItem>
        </FilterEnum>
        <!-- optional, instead of inlining the enum
        <EnumRef IDRef="cbms://philips.com/notifications/soccerTeams"/>
        -->
        <FilterValueName>team</FilterValueName>
        <FilterValueDescription>Soccer team</FilterValueDescription>
    </FilterValue>
</NotificationsFilter>
<NotificationsFilter filterID="4">
    <FilterValue length="32" type="string">
        <FilterValueName>symbol</FilterValueName>
        <FilterValueDescription>Stock ticker symbol</FilterValueDescription>
    </FilterValue>
    <FilterValue length="16" type="float">
        <FilterValueName>price</FilterValueName>
        <FilterValueDescription>Current stock price</FilterValueDescription>
    </FilterValue>
</NotificationsFilter>
</NotificationsFilterTable>
```
~135

FIG. 6

```
<schema ... >
<element name="Notifications" type="esg:NotificationsMainType/>
<complexType name="NotificationsMainType">
    ...
</complexType>
<complexType name="esg:NotificationsMainType">
    <sequence>
        <element name="NotificationsFilterTable" type="esg:NotificationsFilterTableType" minOccurs="0"/>
        ...
    </sequence>
</complexType>
<complexType name="NotificationsFilterTableType">
    <sequence>
        <element name="NotificationsFilter" type="esg:NotificationsFilterType" minOccurs="0"
maxOccurs="unbounded"/>
        <!-- maxOccurs can be bounded by the size of the filter element ID field in the notifications filter format -->
    </sequence>
</complexType>
<complexType name="NotificationsFilterType">
    <sequence>
        <element name="FilterValue" type="esg:FilterValueType" minOccurs="0" maxOccurs="unbounded"/>
        <!-- maxOccurs can be bounded by the size of the filter element ID field in the notifications filter format -->
    </sequence>
    <attribute name="filterID" type="unsignedShort" use="required"/>
</complexType>
```

```
... from Fig. 7a
    <complexType name="FilterValueType">  ~700
        <sequence>
            <element name="FilterValueName" type="mpeg7:TextType" minOccurs="0" maxOccurs="unbounded"/>
            <element name="FilterValueDescription" type="mpeg7:TextType" minOccurs="0" maxOccurs="unbounded"/>
            <element name="FilterEnumBase" type="esg:FilterEnumBaseType"/>
        </sequence>
        <attribute name="length" type="unsignedShort" use="required"/>
        <attribute name="type" type="esg:FilterType" use="required"/>
    </complexType>
    <simpleType name="esg:FilterType">  ~710
        <restriction base="string">
            <enumeration value="integer"/>
            <enumeration value="float"/>
            <enumeration value="string"/>
            <enumeration value="enum"/>
            ...
        </restriction>
    </simpleType>
    <complexType name="FilterEnumBaseType" abstract="true"/>
    <complexType name="FilterEnumType">
        <complexContent>
            <extension base="esg:FilterEnumBaseType">
                <sequence>
                    <element name="FilterEnum" type="esg:EnumType" minOccurs="0" maxOccurs="unbounded"/>
                </sequence>
            </extension>
        </complexContent>
    </complexType>

... from Fig. 7b

```
<complexType name="FilterEnumRefType">
  <complexContent>
    <extension base="esg:FilterEnumBaseType">
      <sequence>
        <element name="FilterRef" type="esg:EnumRefType" minOccurs="0" maxOccurs="unbounded"/>
      </sequence>
    </extension>
  </complexConent>
</complexType>
<complexType name="EnumType">
  <element name="FilterEnumItem" type="mpeg7:TextType">
    <attribute name="itemID" type="unsignedShort" use="required"/>
  </element>
  <attribute name="enumID" type="anyURI" use="required"/>
</complexType>
<complexType name="EnumRefType">
  <attribute name="IDRef" type="anyURI" use="required"/>
</complexType>
</schema>
```

DEVICE AND A METHOD FOR TRANSMITTING NOTIFICATION MESSAGES AND A CORRESPONDING DEVICE AND METHOD FOR RECEIVING NOTIFICATION MESSAGES

FIELD OF THE INVENTION

The invention relates to a device for transmitting notification messages to a terminal.

The invention further relates to a device for receiving notification messages.

The invention further relates to a method for transmitting notification messages to a terminal.

The invention further relates to a method for receiving notification messages.

The invention further relates to a signal.

The invention further relates to a program element.

The invention further relates to a computer-readable medium.

BACKGROUND OF THE INVENTION

DVB-CBMS Phase 2 is standardizing a notification mechanism for delivering messages that contain information relevant to the user or terminal that is currently not conveyed via conventional channels. This notification mechanism can be used to inform the user or the mobile device about certain situations or situation changes, either related to a specific service or of a more general nature. Examples of service related notifications include the start of a certain TV show, the start of a specific item in a broadcast (e.g., the summary of a specific soccer match), or a specific notification in a live broadcast (e.g., an important moment in a sporting match: 'swimmers are approaching finish line'). More general notifications include news items or stock tickers. Notifications can also be used to inform the mobile device itself to perform a certain action. For example, if the Electronic Service Guide (ESG) is updated, the device can receive an event about this and in turn gets the updated version.

The number of notification messages that are expected to be transmitted over DVB-H/DVB-Internet Protocol Data Cast (IPDC) can become very high, while a terminal or user might only be interested in a few of them. In this regard the DVB-CBMS group has defined a technical requirement for a mechanism to easily filter notification messages. However, whilst the technical requirement has been noted no implementation or embodiment has yet been proposed. The goal is to create a standard implementing efficient notification, such as DVB-IPDC version 2.0 or later.

A further consideration is that when the terminal is in a low-power mode (standby), the terminal may still want to receive some notifications to alert the user of important events. Therefore, efficient and low-power reception is an important goal to be achieved.

A trivial solution may be the insertion of a value in a predetermined location in the header of each message, such that the low-level hardware can filter on this value. Such a method is used for filtering the correct transport stream packets for a specific service in a DVB broadcast, known as PID filtering or service selection. However, as notification messages can contain many different kinds of information, filtering will only be useful if a notification message can contain a number of different filtering criteria. A method is needed to bring an efficient yet flexible approach to the transmission of notification messages.

The inventors recognising this problem devised the present invention.

BRIEF SUMMARY OF THE INVENTION

It would be advantageous to achieve an efficient yet flexible approach to the transmission of notification messages to a terminal.

Accordingly, there is provided, in a first aspect of the present invention, a device for transmitting notification messages to a terminal, the device comprising a first input for receiving a filter definition, the filter definition defining a filter type for use in filtering of the notification messages, a second input for receiving notification input data and a processor for transmitting the filter definition to the terminal, for determining filter elements, the filter elements corresponding to parameters derived from the filter definition, the value of the parameters corresponding to the notification input data, the filter elements to be used during a filtering action performed on the notification messages in the terminal, for generating the notification messages, the notification messages comprising the filter elements and for transmitting the notification messages to the terminal.

According to a second aspect of the invention, there is provided, a device for receiving notification messages, the device comprising a communication module having a first input for receiving the notification messages and for receiving a filter definition, the filter definition defining a filter type for use in filtering of the notification messages, a processor communicatively coupled to the communication module for configuring a filter in the device based upon the filter definition, wherein the filter is configured for receiving the notification messages in the device, the notification messages comprising filter elements, the filter elements corresponding to parameters derived from the filter definition, the filter elements to be used during a filtering action performed on the notification messages in the device and for filtering the notification messages in the device, the filtering being based upon the filter elements.

According to a third aspect of the invention, there is provided, a method for transmitting notification messages to a terminal, the method comprising receiving a filter definition, the filter definition defining a filter type for use in filtering of the notification messages, transmitting the filter definition to the terminal, receiving notification input data, determining filter elements, the filter elements corresponding to parameters derived from the filter definition, the value of the parameters corresponding to the notification input data, the filter elements to be used during a filtering action performed on the notification messages in the terminal, generating the notification messages, the notification messages comprising the filter elements and transmitting the notification messages to the terminal.

According to a fourth aspect of the invention, there is provided, a method for receiving notification messages in a terminal, the method comprising receiving a filter definition, the filter definition defining a filter type for use in filtering of the notification messages, configuring a filter in the terminal based upon the filter definition, receiving the notification messages in the terminal, the notification messages comprising filter elements, the filter elements corresponding to parameters derived from the filter definition, the filter elements to be used during a filtering action performed on the notification messages in the terminal and filtering the notification messages in the terminal using the filter, the filtering being based upon the filter elements.

According to a fifth aspect of the invention, there is provided, a signal for transmitting notification messages to a terminal, the signal comprising a filter definition, the filter definition defining a filter type for use in filtering of the notification messages and the notification messages, wherein the notification messages comprise filter elements, the filter elements corresponding to parameters derived from the filter definition, the value of the parameters corresponding to notification input data, the filter elements to be used during a filtering action performed on the notification messages in the terminal.

According to a sixth aspect of the invention, there is provided, a system for transmitting notification messages, the system comprising a transmitter device according to the first aspect of the invention and a terminal device according to the second aspect of the invention.

According to a seventh aspect of the invention, there is provided, a program element directly loadable into the memory of a programmable device, comprising software code portions for performing, when said program element is run on the device, the method of receiving a filter definition, the filter definition defining a filter type for use in filtering of notification messages, transmitting the filter definition to a terminal, receiving notification input data, determining filter elements, the filter elements corresponding to parameters derived from the filter definition, the value of the parameters corresponding to the notification input data, the filter elements to be used during a filtering action performed on the notification messages in the terminal, generating the notification messages, the notification messages comprising the filter elements and transmitting the notification messages to the terminal.

According to a eighth aspect of the invention, there is provided, a computer-readable medium directly loadable into the memory of a programmable device, comprising software code portions for performing, when said code portions are run on the device, the method of receiving a filter definition, the filter definition defining a filter type for use in filtering of notification messages, transmitting the filter definition to a terminal, receiving notification input data, determining filter elements, the filter elements corresponding to parameters derived from the filter definition, the value of the parameters corresponding to the notification input data, the filter elements to be used during a filtering action performed on the notification messages in the terminal, generating the notification messages, the notification messages comprising the filter elements and transmitting the notification messages to the terminal.

According to a ninth aspect of the invention, there is provided, a program element directly loadable into the memory of a programmable device, comprising software code portions for performing, when said program element is run on the device, the method of receiving a filter definition, the filter definition defining a filter type for use in filtering of notification messages, configuring a filter in a terminal based upon the filter definition, receiving the notification messages in the terminal, the notification messages comprising filter elements, the filter elements corresponding to parameters derived from the filter definition, the filter elements to be used during a filtering action performed on the notification messages in the terminal and filtering the notification messages in the terminal using the filter, the filtering being based upon the filter elements.

According to a tenth aspect of the invention, there is provided, a computer-readable medium directly loadable into the memory of a programmable device, comprising software code portions for performing, when said code portions are run on the device, the method of receiving a filter definition, the filter definition defining a filter type for use in filtering of notification messages, configuring a filter in a terminal based upon the filter definition, receiving the notification messages in the terminal, the notification messages comprising filter elements, the filter elements corresponding to parameters derived from the filter definition, the filter elements to be used during a filtering action performed on the notification messages in the terminal and filtering the notification messages in the terminal using the filter, the filtering being based upon the filter elements.

The invention is based upon the realisation that filtering notification messages based upon a number of criteria at a low level is inherently efficient. If this filtering can be done in hardware or possibly a low level software stack, the main CPU of the terminal may remain off, only to be turned on when a notification message of interest is received. According to the invention a filter definition is provided to discriminate different types of filters, in other words the filtering criteria. The filter definition provides a manner of signalling the way a notification filter value should be interpreted by the terminal. The terminal may use the filter definition to interpret the requirements of the filter and to configure the filter appropriately. As such, there is a separation of the definition of the semantics of the filter elements from the transmission of the parameters of the filter elements. This separation allows the filtering to be done without higher level knowledge. In other words, one the filter has been appropriately configured the processor need no longer receive all notifications messages, but only those for which it would like to receive. The separation of the transmission of the semantics of the filter and the parameter values of the filter enables the possibilities of efficient filtering in hardware.

In one embodiment a filter type may define syntax and semantics of a filter to be defined and a transmitter processor may transmit the syntax and semantics of the filter to be defined to the terminal by means of the filter definition. This is advantageous since it allows notification messages to be filtered at the lowest possible level in a terminal.

In a further embodiment the filter definition may comprise a filter type identifier for identifying a particular filter type and a transmitter processor may transmit the filter type identifier to the terminal by means of the filter definition. This is advantageous since it enables the transmission of notification messages by means of a simple name and value pair. The name may be based upon the filter type identifier and the value being based upon an associated parameter to be transmitted.

In another embodiment the filter elements may comprise a further filter type identifier corresponding to the filter type identifier and a transmitter processor may transmit the further filter type identifier to the terminal by means of the filter elements. This is advantageous since the terminal may filter notification messages based upon the filter type identifier in a simple manner.

In yet another embodiment a third input may be provided for receiving configuration input data and a transmitter processor may transmit the configuration input data in combination with the filter definition as configuration data. This is advantageous since configuration data is already sent to the terminal. For example, such configuration data may be a Service guide. The currently provided infrastructure may then be re-used to also transmit the notification messages.

In an embodiment a transmitter processor may be configured to transmit the notification messages using a protocol corresponding to Internet Protocol Datacast over DVB-H.

This protocol allows many advanced services to be offered to consumers in a standardised and compatible manner.

In another embodiment the communication module comprises the filter. This is a very power efficient construction whereby the notification messages may be filtered at the lowest possible level. For example, this may be at hardware level.

In another embodiment a co-processor may be provided and the co-processor may comprise the filter. This offers the possibility of a more flexible filter which may be configurable to handle complex notification message filters.

In a further embodiment the filter definition may comprise a filter type identifier for identifying a particular filter type and the terminal processor may be configured to configure the filter to filter the notification messages based upon the filter type identifier. This is advantageous since it allows communication of the filter definition to proceed in a simple manner. This is especially the case where the particular filter type is a standard filter type or a filter type known by a transmitting device and the terminal.

In an embodiment the filter elements may comprise a further filter type identifier corresponding to the filter type identifier and the filter may be configured to pass filtered notification messages when the further filter type identifier corresponds to the filter type identifier. This is advantageous since it allows notification messages to be filtered at the lowest possible level in a terminal.

In another embodiment the filter elements may comprises a filter element value and the processor may be configured to configure the filter to further filter the notification messages based upon the filter element value. This allows the terminal on the client side to filter based upon these filter element values. It may also be used to evaluate expressions that are defined by, for instance, the terminal 160 or the end-user himself.

In a further embodiment the communication module may further comprise a processor control signal for controlling the operation of the terminal processor based upon filtering of the notification messages in the device. This allows the communication to reduce the power consumption of the terminal by switching the terminal processor off until relevant notification messages are received.

In another embodiment the communication module may be configured to receive the notification messages using a protocol corresponding to Internet Protocol Datacast over DVB-H. This protocol allows many advanced services to be offered to consumers in a standardised and compatible manner.

In a further embodiment a device according to the invention may be realized as at least one of the group consisting of a digital video recording device, a network-enabled device, a conditional access system, a portable audio player, a portable video player, a mobile phone, a DVD player, a CD player, a hard disk based media player, an Internet radio device, a computer, a television, a public entertainment device and an MP3 player. However, these applications are only exemplary.

The data processing required according to the invention can be realized by a computer program, that is to say by software, or by using one or more special electronic optimization circuits, that is to say in hardware, or in hybrid form, that is to say by means of software components and hardware components.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 6 illustrates an embodiment of a filter definition.

FIGS. 7*a*, 7*b* and 7*c* in combination illustrate a further embodiment of a filter definition.

Figure 1:
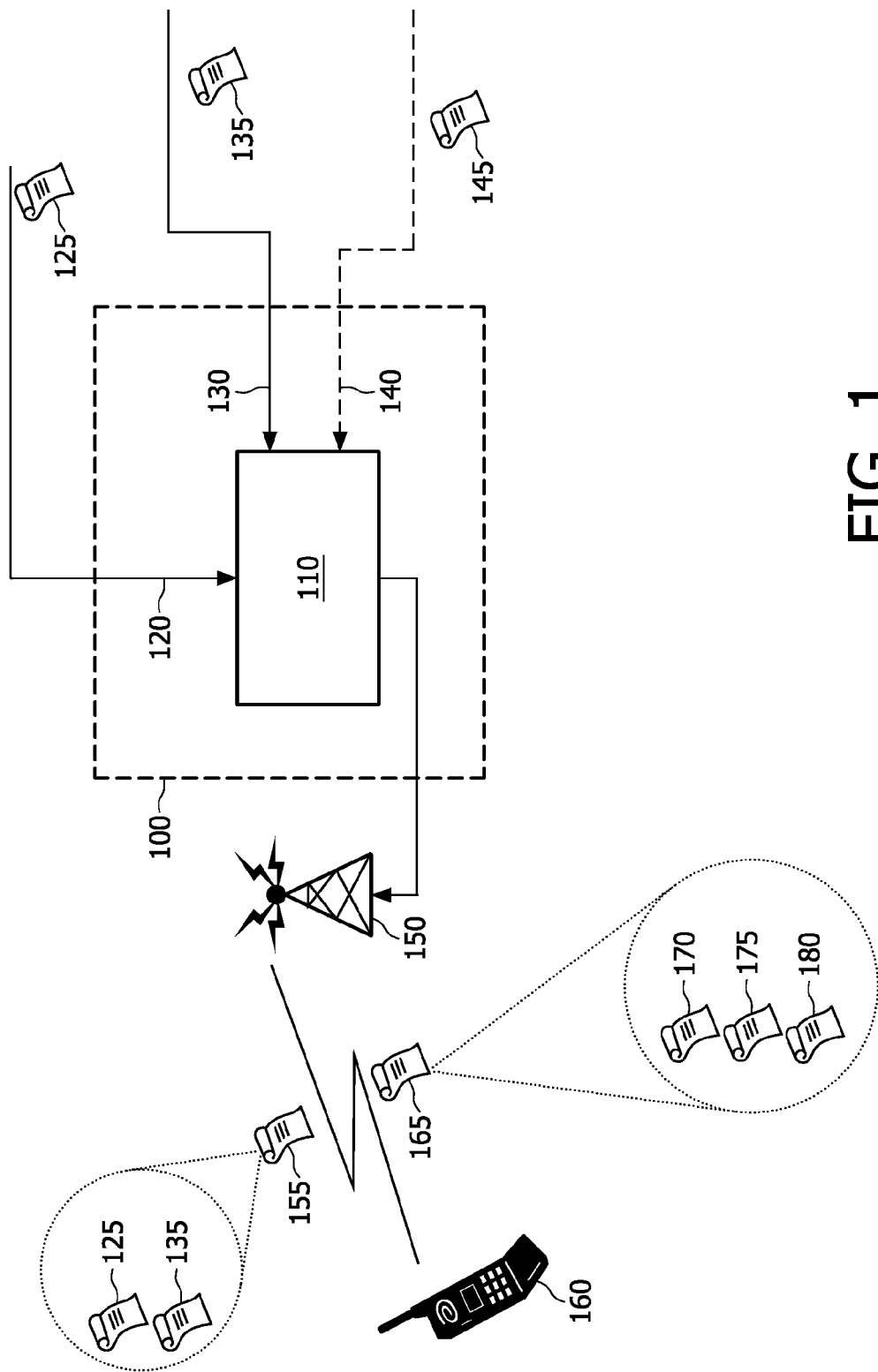
FIG. 1 illustrates an embodiment of a device for transmitting notification messages to a terminal.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

FIG. 1 illustrates an embodiment of a device for transmitting 100 notification messages 165 to a terminal 160. A processor 110, which may be termed a transmitter processor, may be configured to receive configuration input data 125 on a configuration data input 120. The configuration data 155 may be in the form of a Service Guide, SG, or an Electronic Service Guide, ESG. Such a Service Guide or Electronic Service Guide is already known within the context of DVB-H standardisation. For example, this is known from ETSI standard TS 102 471 "Digital Video Broadcasting (DVB); IP Datacast over DVB-H: Electronic Service Guide (ESG)". The processor 110 may also be configured to receive a filter definition 135 on a filter definition input 130. The filter definition 135 may also be termed filter type information.

The filter definition 135 may comprise the type and meaning of a value of each notification filter element 175. This type and meaning may be known as the filter type and may be determined by a filter type identifier 600 or filter identifier. These can be considered fields used in the filtering of the notification. This identifier may reference to a per-service enumeration of different types, called a filter type descriptions or filter lists. It should be noted that 'service-agnostic' notifications may also be considered a service in itself. The structure of this list of filter types may be known as a filter list structure. This enumeration may be present in the ESG, or it may be retrieved over HTTP. Other delivery mechanisms are also possible. The filter type identifiers may be unique within a certain scope. This is useful since it avoids confusion. The scope of the identifiers may for instance be that of a single ESG, or that of an ESG provider, or that of an IP platform. It may also be that of a service, a service bundle, or an IPDC domain, or a country. Alternatively, an identifier may be globally unique, or contained within a certain organizational structure.

The processor 110 may transmit the configuration data 155, comprising the configuration input data 125 and the filter definition 135, to the terminal 160 by making use of a broadcast installation 150. The broadcasting installation 150 should, of course, comprise the necessary component modules such as a modulator, amplifier, antenna etc.

The processor 110 may comprise a notification data input 140 upon which notification input data 145 may be received. The notification input data 145 may be now more than a trigger signal, but it may also comprise information from an external source. For example, it may comprise current stock market prices or current scores at a sports event. The processor 110 may receive the notification input data 145 and generate notification messages 165 based upon the notification input data 145. The generation may take into account the filter definition 135. The processor 110 may determine notification filter elements 175 where the notification filter elements 175 correspond to parameters derived from the filter definition 135. The value of the parameters may correspond to the notification input data 145. For example, the parameters may be the current stock quotes or the latest scores. The notification filter elements 175 may then be the information upon which the actual filtering action is performed, whereas the filter definition 135 may only provide the syntax or logical construction of the filter 260. The notification message 165 may comprise a notification header 170 broadly indicating the content of the notification message 165. This may enable efficient filtering. The notification header 170 is shown in more detail in FIG. 9.

The notification message 165 may also comprise a notification payload 180. It should be noted that the notification filter elements 175 of a notification message 165 may already contain all information present in the notification message 165. The notification payload 180 of a notification message 165 may hence be empty. If we consider the notification filter elements 175 as part of the notification payload 180, the notification payload 180 may consist of only notification filter elements 175. The processor 110 may transmit the notification messages 165 to the terminal 160 by making use of a broadcast installation 150.

Figure 2:
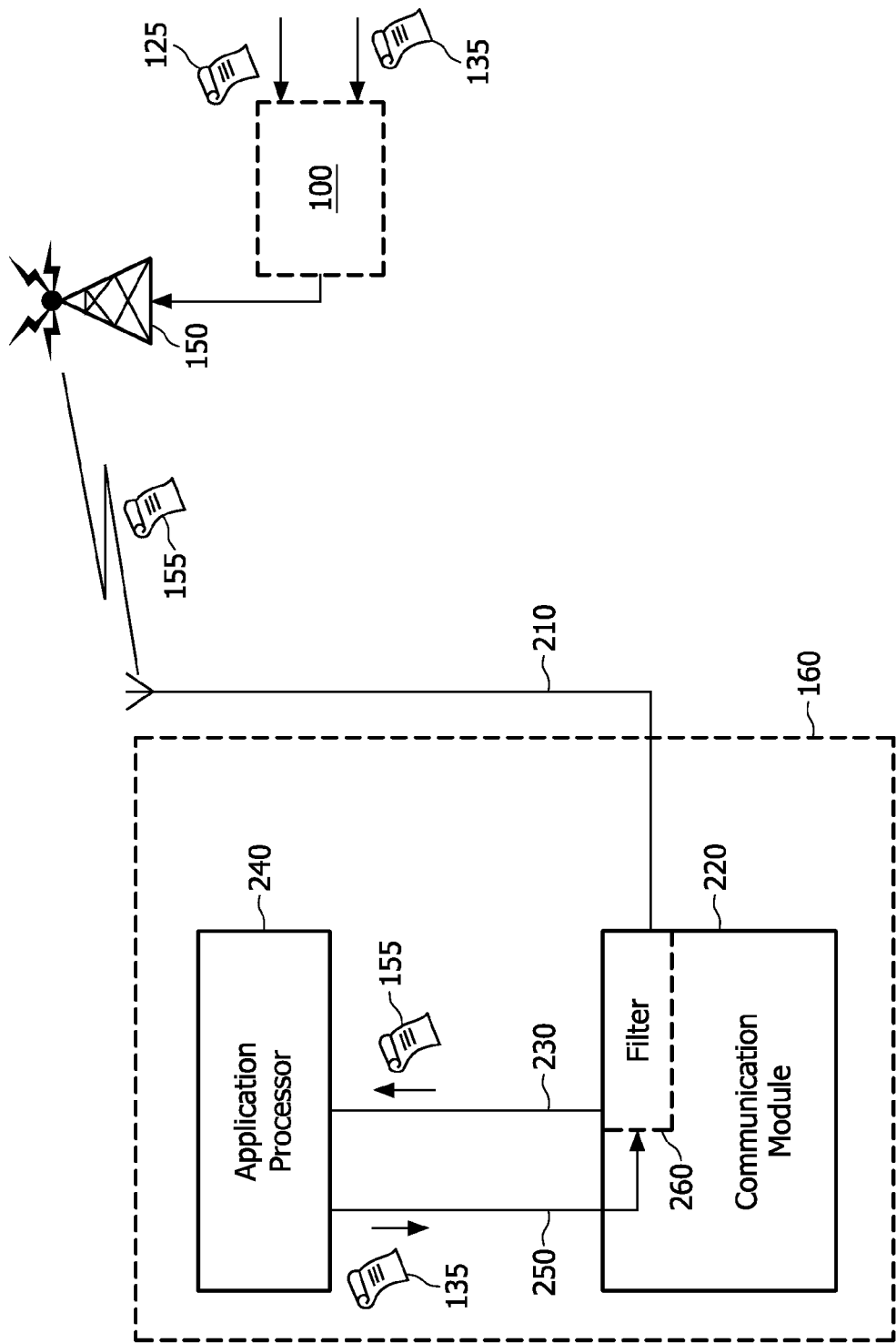
FIG. 2 illustrates an embodiment of a device for receiving notification messages.

In FIG. 2 an embodiment of a device for receiving notification messages 165 is illustrated. This may embodied as the terminal 160. An application may run on the application processor 240. This application may receive the filter definition 135. This may be performed via use of the terminal antenna 210. The filter definition 135 may be termed filter type information. The filter definition 135 may be read from the configuration data 155. The configuration data 155 is generally received in the form of a Service Guide, SG, or an Electronic Service Guide, ESG. The configuration data 155 and the notification messages 165 are generally both sent to the terminal 160 continuously. This normally occurs in a time multiplexed way. This if termed time slicing and allows the terminal 160 to operate in a power efficient manner. The terminal 160 does not have to listen to the configuration data 155 continuously, even though the configuration data 155 is continuously sent. The application running on the application processor 240 may instruct a communication module 220 to filter on certain filter types and certain values or value ranges. This may be achieved by using an internal bus 230. The internal bus 230 may be based upon PCI, SPI, USB or the like. Other proprietary interconnections may achieve the same goal. The communication module 220 may be a DVB-H module configured to receive data in accordance with the DVB-H standard. For example, this is known from ETSI standard EN 302 304 "Digital Video Broadcasting (DVB); Transmission System for Handheld Terminals (DVB-H)". The communication module 220 may comprise a filter 260 to perform the filtering of the notification messages 165.

The notification messages 165 may contain a notification filter, which consists of one or more of the notification filter elements 175. Each of the notification filter elements 175 may have a specific filter type. The specific filter type may define the syntax and semantics of the filter. It may also be identified by the filter type identifier. The filter definition 135, also termed filter type descriptions, may be transmitted within or in parallel to the ESG. They may describe the syntax and semantics of the filter types and again may be identified by the filter type identifier. The filter type descriptions may also be called filter lists. The structure in which way these descriptions are contained, within the ESG or otherwise, may be called the filter list structure or the filter type description structure.

Figure 3:
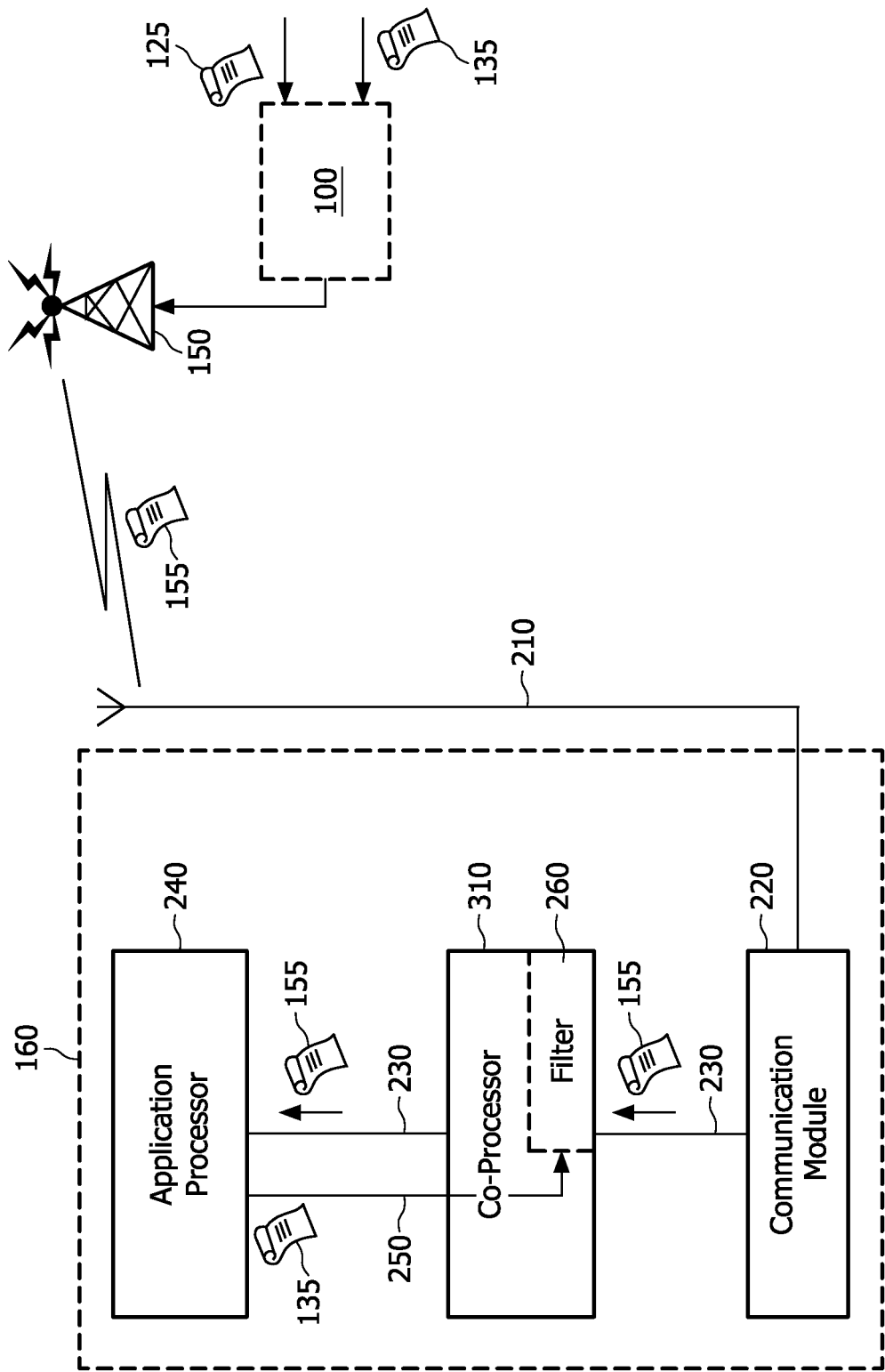
FIG. 3 illustrates a further embodiment of a device for receiving notification messages.

In FIG. 3 a further embodiment of a device for receiving notification messages 165 is shown. In agreement with the embodiment of FIG. 2 an application may run on the application processor 240 and the device may be embodied as the terminal 160. The terminal 160 may comprise a co-processor 310 for off-loading some of the tasks from the application processor 240. For example, the co-processor may be capable of decoding audio and video and communication with the communication module 220 in a fully independent manner. For example, the co-processor 310 may also run a middleware software stack that understands the DVB-H protocol. Any communication between modules within the terminal 160 may be achieved by using the internal bus 230. The application may receive the filter definition 135 from the co-processor 310 or directly from the communication module 220, though the latter is not shown in FIG. 3. The application running on the application processor 240 may instruct the co-processor 310 to filter on certain filter types and certain values or value ranges. The co-processor 310 may comprise the filter 260 to perform the filtering of the notification messages 165. The use of the co-processor allows the filter 260 to be implemented in a flexible manner such that both simple and complex filters may be constructed. It also permits new standard filter types to be created and distributed to the terminal 160 without requiring a hardware revision. The actual process of filtering of the notification messages 165 occurs in a similar manner to that in the embodiment of FIG. 2.

Figure 4:
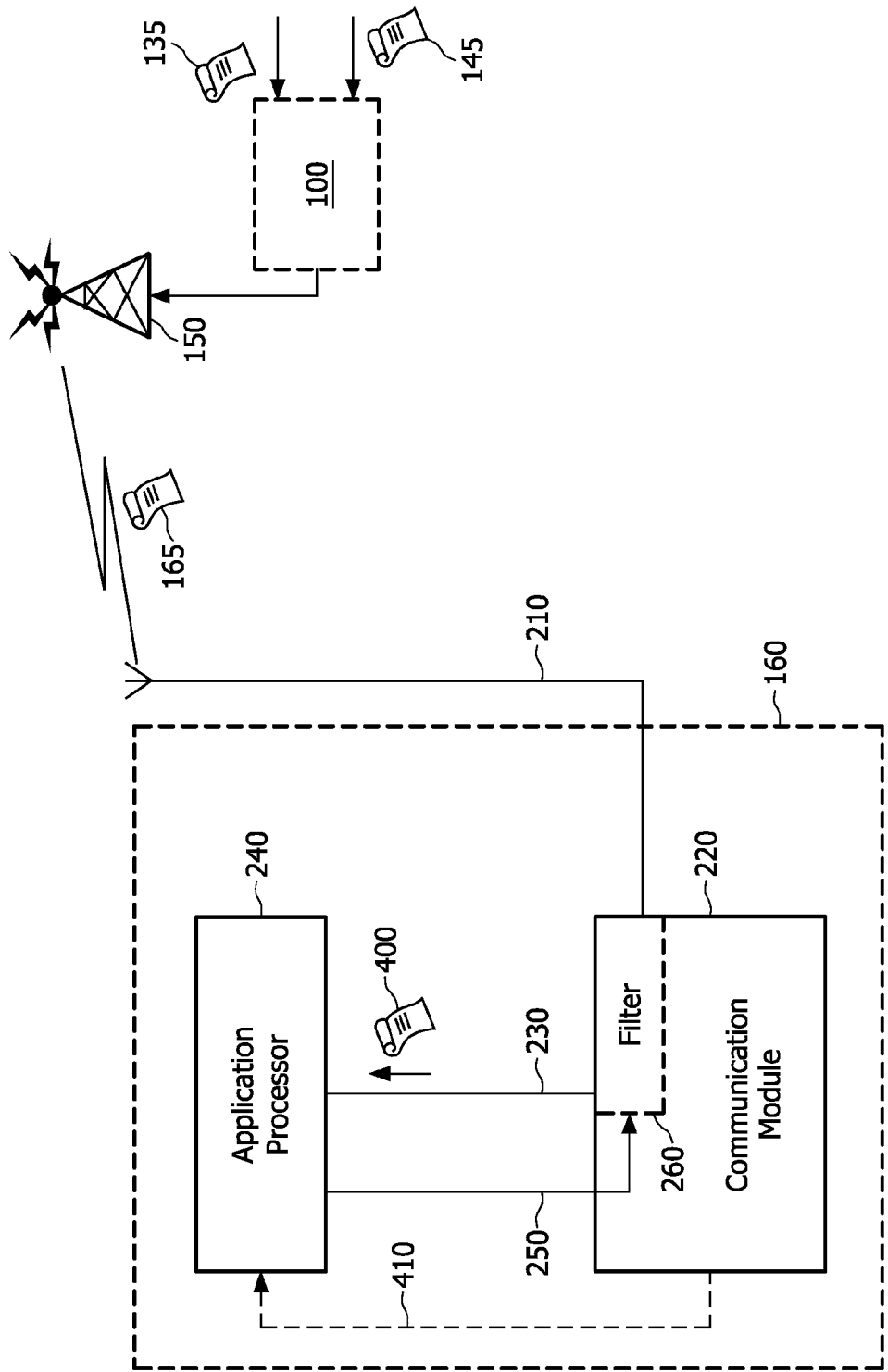
FIG. 4 illustrates an embodiment of a device for receiving notification messages and filtering said notification messages.

In FIG. 4 an embodiment of a device for receiving notification messages 165 and filtering the notification messages 165 is shown. During the process of filtering the application processor 240 may be turned off. For example, this may be achieved by providing a processor control signal 410 between the communication module 220 and the application processor 240. Such control may also be implemented by making use of the internal bus 230. If a notification message matching the criteria is received by the communication module 220 then this notification message will be an filtered notification message 400. The application processor 240 may be turned on to process the filtered notification message 400. The same may be applied to the embodiment of FIG. 3. In this case the co-processor 310 running the middleware stack may wake the application processor 240 when a notification message matching the criteria is detected by the co-processor 310. Again, such a notification message will be considered as being the filtered notification message 400. Again, the application processor 240 may be turned on to process the filtered notification message 400.

A notification message 165 may be the payload of a packet that encapsulates the notification. The message format is agnostic of the underlying protocol. Examples of suitable protocols are FLUTE, ALC or RTP, but even UDP (with proprietary extensions) might suffice. Extensions to the underlying transport protocol are not always necessary but might be beneficial in some cases. In the case that RTP is used as encapsulating protocol, an RTP packet may be embodied as shown in FIG. 5.

Figure 5:
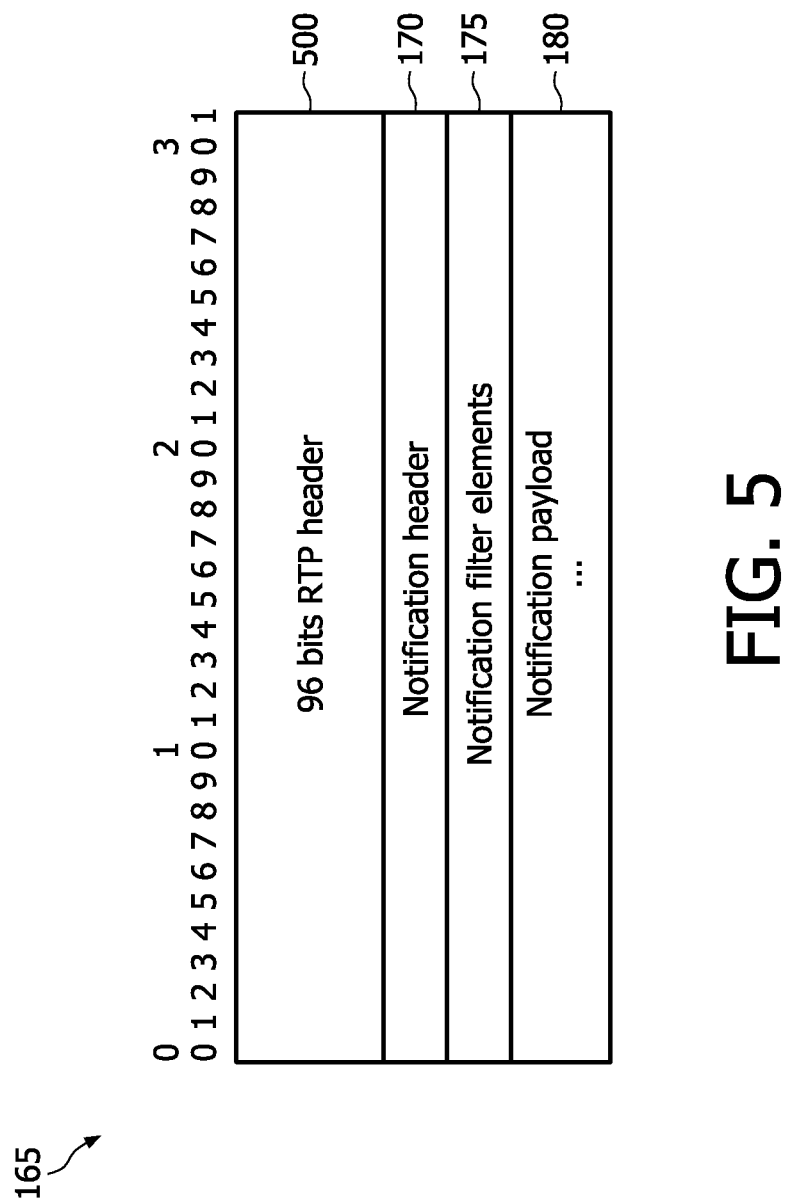
FIG. 5 illustrates an embodiment of a notification message.

In FIG. 5 a possible embodiment of a notification message 165 using RTP as an underlying transport protocol is shown. In this case a special RTP payload format for notification is used consisting of a notification header 170, notification filter elements 175 and a notification payload 180. Note that all three may be contained in the payload of the underlying protocol. In the RTP example also the header extension of RTP itself may be used. In some case this is only recommended for experimental purposes. It should be noted that other protocols, like for instance FLUTE, ALC or proprietary extensions on top of UDP, may also be used.

The notification payload 180 (or notification object) may consist of either a reference to an (external) object or the object itself. In other words, the actual notification objects may be transported out-of-band. In such cases the notification object transported out-of-band may be accompanied by an object descriptor. This object descriptor may be separate from the notification header 170, and possibly even separate from the notification payload 180. Examples of such notification payloads 180 are: text, HTML, RSS data, SVG, audio, video and pictures. For references to notification objects a Universal Resource Identifier (URIs) may be used. In the case where the notification message 165 refers to an external notification object, some elements of the notification header 170 may be available in both the packet carrying the reference itself (e.g. the RTP packet in the example above), and encapsulated with the actual notification object/payload 180 in possibly a different transport protocol. A third option is that the notification object descriptor is carried separate from the reference and the actual notification payload.

The notification message 165 may consist of a notification header 170 (or notification descriptor) and a notification payload 180. The notification message 165 may include instrumentation for an efficient filtering mechanism that may be considered part of the notification header 170 or part of the notification payload 180. In the latter case, the notification header 170 may include a flag or another means of signalling to indicate that filtering information is present. As mentioned, the instrumentation for the filtering could also be a (header) extension to the underlying transport protocol (e.g. FLUTE or RTP). The filter mechanism itself consists of adding one or more filter elements 175 to the notification message 165, containing information the receiving client, or terminal 160, may use to decide if the message is of interest.

The filter elements 175 may carry filter variables that can be simple scalars or more complex filter variable types. On the client side these filter values (or key fields) may be used to evaluate expressions that are defined by, for instance, the terminal 160 or the end-user. These filter expressions or filter rules may simply consist of comparing variables to pre-defined values but also more advanced expressions using more complex (logical) operators are possible. The filter elements 175 may contain a filter identifier, i.e. an ID, that corresponds to an item in an enumeration. For example, an enumeration with sports teams, GPS coordinates, opening hours of a place of interest, stock symbol, or stock price. The proposed solution separates the definition of the semantics of the filter elements from the transmission, so the filtering can be done without higher level knowledge. This enables the possibilities of efficient filtering in hardware.

In case where the notification message 165, and possibly also its filter elements 175, are larger than the Maximum Transmission Unit, MTU, of the underlying transport protocol some form of fragmentation of the payload may be used in order to distribute the payload over multiple packets of the underlying protocol. On the other hand, it may also be possible that a number of small messages including filter elements may be aggregated into a single payload. This holds without loss of generality of the concept described.

It is possible that the filter elements 175 are encrypted or exposed to complex error correction schemes for privacy, content protection and data reliability considerations. However, should this be done care should be taken to ensure that the low-level filtering of the messages based on the criteria remains efficient.

FIG. 6 illustrates an embodiment of the filter definition 135 in detail. The filter definition 135, or filter type description, may contain at least the filter type identifier 600 of the filter type, the length 610 of the filter element value, the machine interpretation and the semantic meaning. As examples, the machine interpretation may be int, float, enum, etc. Additionally, the description could also contain the unit of the value (e.g., US Dollars, kilometers), a value range (e.g. with minimum and maximum values), a step size of the value, a human-readable name and description, and other information. Compound filter types are possible as well, in which case the filter definition 135 may comprise of a sequence of entries containing length, machine interpretation, and semantic meaning. The filter definition 135 may be represented in an XML fragment. An example of an XML fragment containing a basic type description and a compound type description is shown in FIG. 6. The XML fragment of FIG. 6 may be included in the ESG or elsewhere, in which case the XML schema of the ESG or other possible parent document may need to be extended.

FIGS. 7a, 7b and 7c in combination illustrate a further embodiment of a filter definition illustrating a possible XML schema. It should be noted that this is not a complete definition and is for illustration only. The schema allows both a complex filter type 710 and a simple filter type 710 to defined in the filter definition 135.

Figure 8:
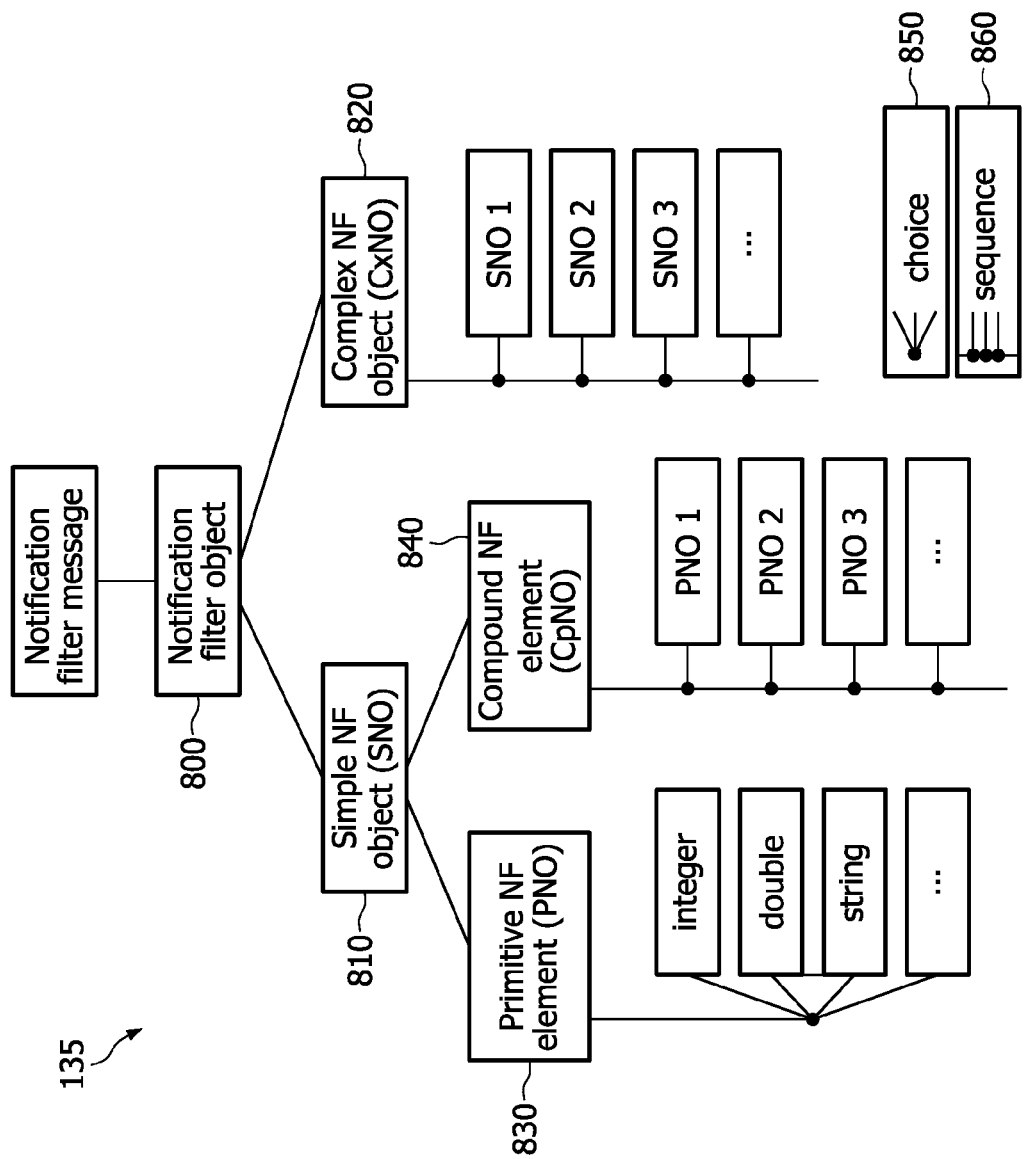
FIG. 8 illustrates a further embodiment of a filter definition.

FIG. 8 illustrates a further embodiment of a filter definition in a more generalized level. The description of the filter types may be expressed in the tree structure shown in FIG. 8. The filter definition 135 and corresponding notification messages 165 may both refer to a notification filter object 800. The notification filter object 800 may be instantiated as a simple notification filter object 810 corresponding to a simple filter type 710 or it may be instantiated as a complex notification filter object 820 corresponding to a complex filter type 700.

Within the hierarchy of the simple notification filter object 810 a further classification may be created from primitive notification filter elements 830 and compound notification filter elements 840. The primitive notification filter elements 830 may be a choice 850 from a plurality of known or standard types. For example, the primitive notification filter elements 830 may be selected from integers, doubles, strings, etc. The compound notification filter elements 840 may comprise a sequence 860 of known or standard types of primitive notification filter elements 830. Within the hierarchy of the complex notification filter object 820 may comprise a sequence 860 of a plurality of the simple notification filter objects 810.

For basic filter types, the length 910 of the basic filter type may be in the notification filter element 175. The filter definition 135, or filter type descriptions, or filter structures or filter type structures, may describe the following non-exhaustive list of machine interpretations (or "data types" or "variable types" or "type"):

duration, dateTime, time, date, boolean, base64Binary, hexBinary, float, double, anyURI, string, normalizedString, token, language, Name, ID, IDREF, ENTITY, decimal, integer, nonPositiveInteger, negativeInteger, long, int, short, byte, nonNegativeInteger, unsignedLong, unsignedInt, unsignedShort, unsignedByte, positiveInteger, fixedPoint, array.

Furthermore, this list can be expanded with TV-Anytime data types and MPEG-7 data types.

Also, a zero-length data type or zero-length type or zero-value type or non-value type or flag may be defined. Such a special type may have no value, so the value length of the notification filter element 175 containing this type may be zero. The presence of this type in the notification filter element 175 of a notification message 165 may already significant. In other words, the terminal 160 may be merely interested in messages that carry a notification filter element 175 of this type. Alternatively, a number of types can be predefined, like a 32 bit integer. This is useful if the semantics of the value is implicitly determined by the service and/or by the application running in the terminal 160. This way, the filter type definition may be implicitly communicated to the terminal 160 and no length field needs to be present in the notification filter element 175. A number of IDs can be reserved for this use. For example, the first 15 ID numbers may be reserved for this purpose.

It is functionally equivalent to use one notification filter element 175 per notification message 165 comprising of a compound type (consisting of other sub filter elements), or to use multiple filter elements per notification message 165 consisting of basic types. Both approaches have their advantages and disadvantages. The major advantage of using one element per notification message, where the element can either be compound or basic, is that the application layer exactly knows the layout of the filter part of the notification message 165 and can hence instruct the filter 260 very precisely what to filter. For example, it could instruct the filter 260 to filter "the value in bits 16 to 31 should be greater than 231". The filtering may then be very efficient, especially when performed in hardware. Using multiple filter elements per notification message 165 results in less concise instructions. For example, the filter 260 may be instructed to filter "the filter element with filter type identifier 5 should be greater than 231". In which case the filter 260 has to look at all notification filter elements 175 to see if they match the criteria. To do so, the filter 260, or hardware, needs to know the length of every element. In this case it is beneficial if the notification filter elements 175 would be either of a fixed length or contain their own length or have a known separator in between elements.

The preferred implementation may allow multiple notification filter elements 175 per notification message 165. The notification filter elements 175 may consist in this case of the filter type identifier 600, the length 610 of the value of the filter element and the actual value 920. Filtering will take place on ID-value combinations (sometimes called name-value or key-value pairs), where the comparisons of both the ID and value might be implemented using bitmasks.

Figure 9:
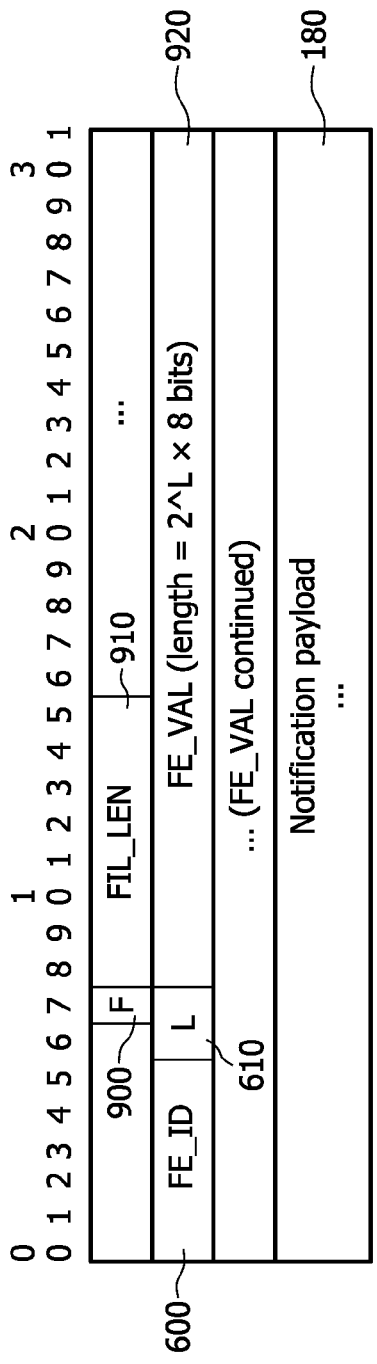
FIG. 9 illustrates a detailed embodiment of a notification message.

FIG. 9 illustrates a detailed embodiment of a notification message. The ID and value pairs upon which filtering may be based are shown. The notification filter elements 175 might contain an indication of the length 610 of the filter element value. This may be in bits or bytes. This gives protection against unknown filter elements. The filter implementation may then skip or jump over the unknown elements, because the length of the element will always be known. This allows the method to be extended in a backward compatible way. Furthermore within a service the set of notification filter elements of a specific notification service may dynamically change over time.

There are many possible embodiments of the notification header 170. Some of the elements are optional and the bit-allocations shown in FIG. 9 are mere examples. Some of the header field elements may be variable length encoded. The notification header 170 may contain:

Filter Present Flag 900 (F): 1 Bit

This field may indicate whether the notification message 165 contains notification filter elements 175. This flag can be convenient if there is one bit left available in the notification header 170.

Filter Length 910 (FIL_LEN): 6-8 Bits

Total length of the filter part of the notification message 165. The length of this field may depend on how many bits are conveniently left in the notification header 170. If there is a filter present flag defined, this field need not be present if F=0. If a filter present flag is defined, FIL_LEN is the total length of the filter part of the message minus one. As an alternative to using F the FIL_LEN could be always present with a value of zero indicating that there are no filter elements.

The notification filter elements 175 may be a repetition of the following either in the notification header 170 or in the notification payload 180:

Filter Type Identifier 600 (FE_ID): 6 Bits

A reference to the exact description regarding syntax and semantics of the type of the value contained in the filter element. This description may be in an XML fragment (i.e. out-of-band), either contained in the (bootstrap) ESG or obtainable elsewhere.

Filter Element Value Length 610 (L): 2 Bits

Indication of the number of bits in FE_VAL. The length of FE_VAL may be determined by $(2^L)*8$ bits. Alternatively, the length of the notification filter element value may be encoded by variable length unsigned integer most significant bit first encoding. The sign bit may indicate if the following byte also contributes to the length. This is commonly used in numerous DVB specifications. This is necessary in case of variable length filter elements such as strings. Note that this value may also be omitted from the notification header 170 since it is also announced in the exact description. However to simplify the parsing it may also be carried explicitly.

Filter Element Value 920 (FE_VAL): 8, 16, 32 or 64 Bits

The actual value of the notification filter element 175. Type and meaning are to be found in the filter type descriptor or filter definition 135 and is referenced by FE_ID. The length of the FE_VAL field is $(2^L)$ bytes if present, otherwise length is obtained from the exact description of the filter element.

Figure 10:
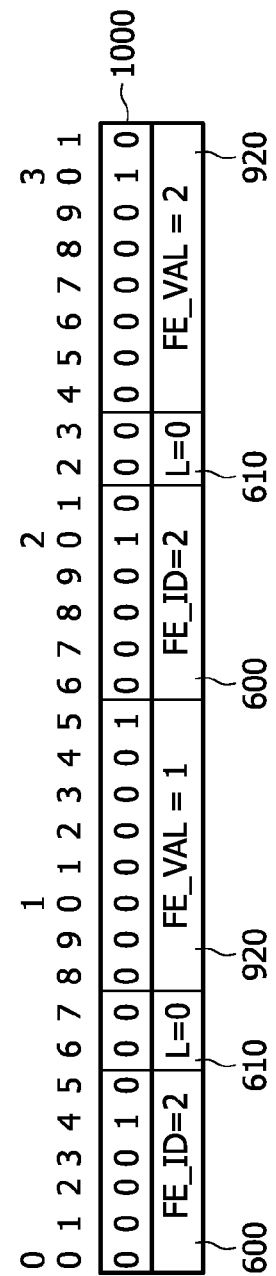
FIG. 10 illustrates a further detailed embodiment of a notification message.

FIG. 10 illustrates a further detailed embodiment of a notification message. In the example shown in FIG. 10, a notification message 175 is shown that contains a score update of a soccer match between Germany and France. The notification message 175 may embed (at least) the following two filter elements, based on the example ESG fragment of FIGS. 7a, 7b and 7c. The filter type identifier 600 has a value of 2, in this example. The filter element value length 610, L, has a value of zero since a filter with the filter type identifier 600 has a value of 2 is a standard filter. The filter element value 920, FE_VAL, has the value of 1. Therefore, Germany has scored 1 goal. A subsequent filter element value, FE_VAL, of 2 indicates that France has scored 2 goals. FIG. 10 also illustrates a binary representation 1000 of the example just described.

If FLUTE is used as underlying transport protocol, the proposed solution may be used just as well. The notification messages 165 may be transport layer independent. In the case of FLUTE, however, the notification filter elements 175 may also be included in the File Descriptor Table (FDT) of the FLUITE protocol. As this table always needs to be retrieved before retrieving other FLUTE objects, such as notification messages 165, then the notification filter elements 175 could already provide the terminal 160 with information on which notification messages 165 need to be retrieved from the FLUTE session. To implement this, suitable tags and/or attributes may need to be defined in the XML schema for an FDT instance. Reference is made to section 3.4.2 of rfc 3926 inn this case. These tags and/or attributes may have the FDT-Instance tag as parent, or the File tag as parent, or any other suitable tag. In other words the notification filter elements 175 may be defined at FDT level or at file level. Alternatively, notification filter elements 175 may be included in the Layered Coding Transport, LCT, header extensions in the headers of specific LCT packets containing the notification messages 165 or parts thereof. Reference is made to Luby, M., Gemmell, J., Vicisano, L., Rizzo, L., Handley, M., and J. Crowcroft, "Layered Coding Transport (LCT) Building Block", RFC 3451, December 2002. This is true similarly for Asynchronous Layered Coding, ALC. Reference is made to Luby, M., Gemmell, J., Vicisano, L., Rizzo, L., and J. Crowcroft, "Asynchronous Layered Coding (ALC) Protocol Instantiation", RFC 3450, December 2002. For instance an ALC/LCT header extension (HET) of a newly defined type EXT_FLT could be used to carry the filtering elements in a transparent way.

In summary the invention discloses methods and devices for transmitting notification messages and corresponding methods and devices for receiving such notification messages. A transmitting device may receive a filter definition defining a filter type for use in filtering of the notification messages. The filter definition may be transmitted to a terminal via a broadcast installation. The terminal may configure a filter based upon the filter definition. When a notification is to be sent notification input data may be received and filter elements may be determined. The filter elements may correspond to parameters derived from the filter definition. The value of the parameters may correspond to the notification input data. The notification messages may comprise the filter elements and may be generated and sent to the terminal. The terminal may filter the notification messages using the filter, where the filtering may be based upon the filter elements.

Figure 11:
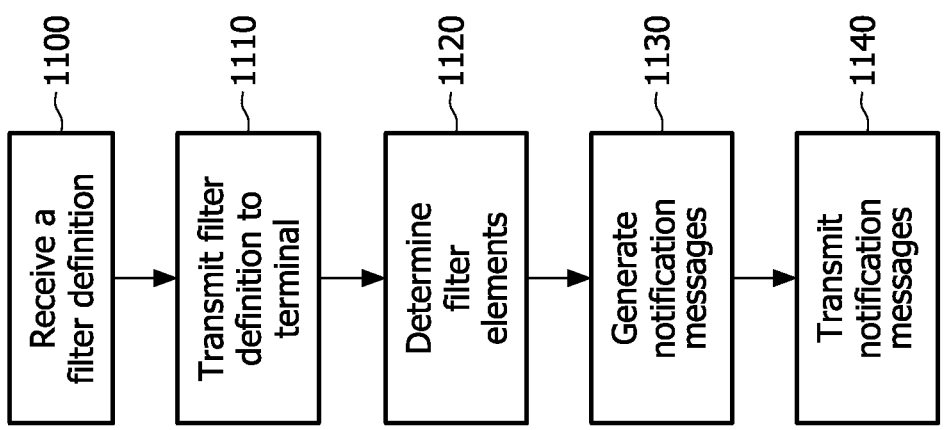
FIG. 11 illustrates an embodiment of a method for transmitting notification messages.

As an example, FIG. 11 illustrates an embodiment of a method for transmitting notification messages. In step 1100 the filter definition 135 defining a filter type for use in filtering of the notification messages 165 may be received. Thereafter, the filter definition 135 may be transmitted in step 1110 to the terminal 160 via a broadcast installation 150. When a notification is to be sent the notification input data 145 may be received and the notification filter elements 175 may be determined in step 1120. The notification filter elements 175 may correspond to parameters derived from the filter definition 135. The value of the parameters may correspond to the notification input data 145. The notification messages 165 may comprise the notification filter elements 175 and may be generated in step 1130 and sent to the terminal 160 in step 1140 by transmitting them using the broadcast installation 150 once more. It should be noted that in a practical implementation both the filter definition 135 and the notification messages 165 may be transmitted in a time multiplexed manner. Therefore, new filter definitions may be transmitted substantially simultaneously with notification messages 165 according to a previously transmitted filter definition. Care should, of course, be taken to ensure that the user experience remains understandable.

Figure 12:
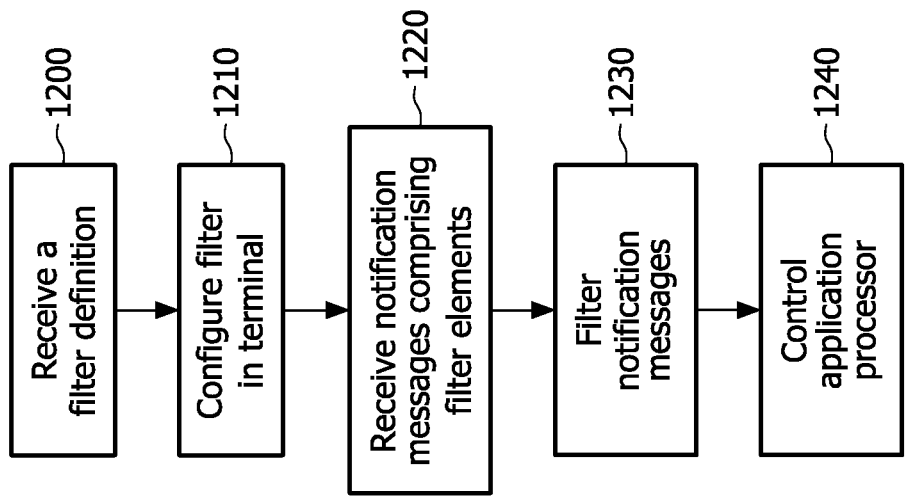
FIG. 12 illustrates an embodiment of a method for receiving notification messages.

As a further example, FIG. 12 illustrates an embodiment of a method for receiving notification messages. The terminal 160 may receive the filter definition 135 in step 1200 and configure the filter 260 based upon the filter definition 135. The terminal 160 may, at some time later, receive notification messages 165 in step 1220. The notification messages 165 may comprise the notification filter elements 175 allowing the terminal 160 to filter the notification messages 165 in an efficient manner using the filter 260 that has been appropriately configured. This occurs in step 1230. Optionally, the terminal 160 may upon filtering the notification messages 165 using the filter 260 also control the operation of the application processor 240. Such control could be implemented such that the application processor 240 is turned off and run at a reduced speed to save power up to the time until the notification message 165 is to be processed. The application processor 240 may then be triggered into operation to process the filtered notification message 410.

It should be noted that the above-mentioned embodiments illustrate rather than limit the invention, and that those skilled in the art will be capable of designing many alternative embodiments without departing from the scope of the invention as defined by the appended claims. Furthermore, any of the embodiments described comprise implicit features, such as, an internal current supply, for example, a battery or an accumulator. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device for transmitting notification filter messages to a terminal, the device comprising:
    a first input for receiving a filter definition, the filter definition defining a filter type for use in filtering of the notification filter messages, by signalling how values of filter elements in the notification filter message should be interpreted by the terminal during the filtering of the notification filter messages via an appropriately configured filter in the terminal;
    a second input for receiving notification input data; and
    a processor configured for:
    transmitting the filter definition to the terminal;
    determining filter elements, the filter elements corresponding to parameters derived from the filter definition, the value of the parameters corresponding to the notification input data, the filter elements to be used during a filtering action performed on the notification filter messages in the terminal;
    generating the notification filter messages, the notification filter messages comprising filter elements of respective notification filter messages, wherein the notification filter messages include a summary of the contents of the notification filter messages; and transmitting the notification filter messages to the terminal, whereby the notification filter messages are filtered by the appropriately configured filter in the terminal while a main CPU of the terminal is in a sleep state, to be turned on when a notification filter message is received.

2. The device of claim 1 wherein the filter type defines syntax and semantics of a filter to be defined and the processor transmits the syntax and semantics of the filter to be defined to the terminal by means of the filter definition.

3. The device of claim 1 wherein the filter definition comprises a filter type identifier for identifying a particular filter type and the processor transmits the filter type identifier to the terminal by means of the filter definition.

4. The device of claim 3 wherein the filter elements comprise a further filter type identifier corresponding to the filter type identifier and the processor transmits the further filter type identifier to the terminal by means of the filter elements.

5. The device of claim 1 further comprising a third input for receiving configuration input data and wherein the processor transmits the configuration input data in combination with the filter definition as configuration data.

6. The device of claim 1 wherein the processor is configured to transmit the notification messages using a protocol corresponding to Internet Protocol Datacast over DVB-H.

7. A device for receiving notification filter messages, the device comprising:
   a communication module having a first input for receiving from the notification filter messages and for receiving a filter definition, the filter definition defining a filter type for use in filtering of the notification filter messages, by signalling how values of filter elements in the notification filter message should be interpreted by the device during the filtering of the notification filter messages; and
   a processor communicatively coupled to the communication module configured to configure a filter in the device based upon the filter definition,
   wherein the filter is appropriately configured for receiving the notification filter messages in the device,
   the notification filter messages comprising the filter elements,
   the filter elements being encrypted and corresponding to parameters derived from the filter definition,
   the filter elements being configured to filter the notification filter messages in the device while a main CPU of the terminal is in a sleep state, and
   wherein the CPU of the terminal is turned on when a notification filter message is received.

8. The device of claim 7 wherein the communication module includes the filter.

9. The device of claim 7 further comprising a co-processor and wherein the co-processor includes the filter.

10. The device of claim 7 wherein the filter definition includes a filter type identifier for identifying a particular filter type and the processor is configured to configure the filter to filter the notification filter messages based upon the filter type identifier.

11. The device of claim 10 wherein the filter elements comprise a further filter type identifier corresponding to the filter type identifier and the filter is configured to pass filtered notification filter messages when the further filter type identifier corresponds to the filter type identifier.

12. The device of claim 10 wherein the filter elements comprise a filter element value and the processor is configured to configure the filter to further filter the notification filter messages based upon the filter element value.

13. The device of claim 7 wherein the communication module further comprises a processor control signal for controlling the operation of the processor based upon filtering of the notification filter messages in the device.

14. The device of claim 7 wherein the communication module is configured to receive the notification filter messages using a protocol corresponding to Internet Protocol Datacast over DVB-H.

15. The device of claim 7 realized as at least one of the group consisting of:
   a digital video recording device;
   a network-enabled device;
   a conditional access system;
   a portable audio player;
   a portable video player;
   a mobile phone;
   a DVD player;
   a CD player;
   a hard disk based media player;
   an Internet radio device;
   a computer;
   a television;
   a public entertainment device; and
   an MP3 player.

16. A method for receiving notification filter messages in a terminal, the method comprising:
   receiving a filter definition sent from a device, the filter definition defining a filter type for use in filtering of the notification filter messages, by signalling how values of filter elements in the notification filter messages should be interpreted by the terminal during the filtering of the notification filter messages via an appropriately configured filter in the terminal, wherein the notification filter messages include a summary of the contents of the notification filter messages;
   transmitting the filter definition from the device to the terminal;
   receiving, at the device, notification input data;
   determining by the device filter elements, the filter elements corresponding to parameters derived from the filter definition, the value of the parameters corresponding to the notification input data, the filter elements to be used during a filtering action performed on the notification filter messages via the appropriately configured filter in the terminal;
   generating at the device the notification filter messages, the notification filter messages including the filter elements; and
   transmitting the notification filter messages to the terminal whereby the notification filter messages is filtered by the appropriately configured filter in the terminal while a main CPU of the terminal is in a sleep state to be turned on when a notification filter message is received.

17. A method for receiving notification filter messages in a terminal, the method comprising:
   receiving a filter definition sent from a device, the filter definition defining a filter type for use in filtering of the notification filter messages, by signalling how values of filter elements in the notification filter messages should be interpreted by the terminal during the filtering of the notification filter messages;
   configuring a filter in the terminal appropriately based upon the filter definition;
   receiving the notification filter messages in the terminal, the notification filter messages being sent from said device and including filter elements, the filter elements being encrypted and corresponding to parameters derived from the filter definition, the filter elements to be used during a filtering action performed on the notification filter messages via the appropriately configured filter in the terminal; and filtering the notification filter messages in the terminal using the appropriately configured filter, the filtering being based upon the filter elements whereby the notification filter messages is filtered by the appropriately configured filter in the terminal while a main CPU of the terminal is in a sleep state, wherein the CPU of the terminal is turned on when a notification filter message is received.

* * * * *